United States Patent
Fu (10) Patent No.: US 11,822,530 B2
(45) Date of Patent: Nov. 21, 2023

(54) AUGMENTATION TO THE SUCCINCT TRIE FOR MULTI-SEGMENT KEYS

(71) Applicant: Alibaba Group Holding Limited, George Town (KY)

(72) Inventor: Chen Fu, Cupertino, CA (US)

(73) Assignee: Alibaba Group Holding Limited

( * ) Notice: Subject to any disclaimer, the term of this patent is extended or adjusted under 35 U.S.C. 154(b) by 205 days.

(21) Appl. No.: 16/749,319

(22) Filed: Jan. 22, 2020

(65) Prior Publication Data

US 2021/0224240 A1   Jul. 22, 2021

(51) Int. Cl.
G06F 16/22       (2019.01)
G06F 16/248     (2019.01)
G06F 16/242     (2019.01)
G06F 16/2455   (2019.01)

(52) U.S. Cl.
CPC ........ *G06F 16/2246* (2019.01); *G06F 16/242* (2019.01); *G06F 16/248* (2019.01); *G06F 16/24554* (2019.01)

(58) Field of Classification Search
None
See application file for complete search history.

(56) References Cited

U.S. PATENT DOCUMENTS

| | | | |
|---|---|---|---|
| 6,804,677 B2 | 10/2004 | Shadmon | |
| 7,287,033 B2 | 10/2007 | Shadmon | |
| 9,589,006 B2 | 3/2017 | Boldyrev | |
| 2009/0222419 A1* | 9/2009 | Lam | G06F 16/81 707/E17.127 |
| 2016/0300566 A1* | 10/2016 | Hofer | G10L 15/08 |
| 2017/0255670 A1* | 9/2017 | Lei | H03M 7/3097 |
| 2019/0324960 A1* | 10/2019 | Bauer | G06F 16/2237 |
| 2022/0255014 A1* | 8/2022 | Lambov | H01L 51/0058 |

OTHER PUBLICATIONS

Zhang et al., "Succinct Range Filters", 2019 (Year: 2019).*
Chang et al., Bigtable: A Distributed Storage System for Structured Data, OSDI, 2006.
Grossi et al., Fast Compressed Tries Through Path Decompositions, Dec. 3, 2011.
O'Neil et al., The Log-Structured Merge-Tree (LSM-Tree). Acta Informatica, 33(4):351-385, 1996.
PlainTable, PlainTable—A New File Format, RocksDB, Jun. 23, 2014.

(Continued)

*Primary Examiner* — Dawaune A Conyers
(74) *Attorney, Agent, or Firm* — Van Pelt, Yi & James LLP (57) ABSTRACT

Mechanisms for constructing and querying a database are described. Constructing the database includes accessing the database comprising multi-component data and constructing an augmented succinct trie (AST) as an index of the database. The database includes sorted data blocks. Construction of the AST is based on the multi-component data. The AST includes indications of boundaries of the data components of the multi-component data. Querying the database includes accessing a key comprising multiple data components and augmenting the key data with data component boundary information. The AST is searched using the augmented key and a search result provided as a value corresponding to the key in the database.

25 Claims, 7 Drawing Sheets

(56) References Cited

OTHER PUBLICATIONS

Redislabs, Best Practices, Basic Rate Limiting, Feb. 16, 2019, retrieved from Wayback Machine, https://redislabs.com/redis-best-practices/basic-rate limiting/.

Timo Bingmann, STX B+ Tree C++ Template Classes, Apr. 27, 2007.

Zhang et al., SuRF: Practical Range Query Filtering with Fast Succinct Tries, SIGMOD'18, Jun. 10-15, 2018.

* cited by examiner

| Label | a | $ | n | $ | d | l | d | k |
|---|---|---|---|---|---|---|---|---|
| Has Child | 1 | 0 | 1 | 0 | 0 | 0 | 1 | 0 |
| LOUDS | 1 | 1 | 0 | 1 | 0 | 0 | 0 | 1 |
| Continuation | 0 | 0 | 1 | 1 | 0 | 0 | 1 | 0 |
| Value |  | V1 |  | V2 | V3 | V4 |  | V5 |

AUGMENTATION TO THE SUCCINCT TRIE FOR MULTI-SEGMENT KEYS

BACKGROUND OF THE INVENTION

Data storage systems can organize data in trees. At the lowest level of some trees are data blocks. Each data block includes multiple records. Each record includes a key and a value. The value stores the data. The key is used to sort the data. Each data block is sorted in key order. Higher levels of the tree store an index in index blocks. An index is a data structure that may improve the speed of data retrieval operations. An index block includes records for the index. For a record in an index block, the key is the key for the first record ("first key") in a block one level lower in the tree than the index block and the value points to the block one level lower in the tree than the index block. For example, index blocks in the level immediately above the data blocks include the first keys of data blocks and pointers to the data blocks. A particular index block higher in the tree includes first keys of index blocks in a level immediately below the particular index block and pointers to the index blocks in the level immediately below the particular index block. Records for the index block are also sorted in key order. Although such an index can improve the speed of data retrieval, the index consumes a significant amount of space. There are some solutions to reduce the space required for the index. However, such solutions can lead to errors when used in certain data storage systems, such as systems that implement an index with multi-component keys.

Thus, a mechanism for efficiently storing data, particularly an index that uses multi-component keys, is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium such as a tangible computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data storage systems can organize data in trees. For example, a B+ tree includes data blocks at the lowest level of the tree. Each data block includes records, each of which has a key and a value. Each data block is sorted in key order. Higher levels of the tree store an index in index blocks. Each index block also includes records, each of which has a key and a value. The key is the first key for a block in the level below the index block. The value is a pointer to the corresponding block in the level below. Thus, the first level of index blocks includes the first keys of the data blocks and pointers to the data blocks. Subsequent levels of the index blocks include first keys of the index blocks from the level below and pointers to the index blocks.

Some data storage system store multi-component data. Such data storage system may use multi-component keys. These keys may be desired to be sorted on a data component basis. For example, a data storage system may include data related to users, including each user's first name, last name, address, account information and/or other data. The last name and first name may be used as the multi-component key for the data storage system. The keys may be sorted on a per data component basis: last name and then first name. For example, the users Adam Smith; John Smith; David Smithe; and Ralph Smyth have keys that are sorted in order as: smith.adam, smith.john, smithe.david, smyth.ralph, where a period (.) denotes the boundary between data components of the key.

Although indexes can be stored in tree structures such as B+ tree structures, the size of the index is desired to be reduced. To do so, a succinct trie (ST) may be used. A succinct trie utilizes redundancies in keys that are strings. Keys that are strings may share a common prefix. For example, the keys "app", "apple" and "approach" share the prefix "app". In a succinct trie, the common prefixes are represented by common root-to-node paths. This reduces the storage required for keys sharing common prefixes. The succinct trie can be used as an index for the trees described above because indexes are simply sorted maps from keys to block addresses. Thus, the succinct trie can significantly reduce the storage footprint for the index.

Although the succinct trie may reduce the storage required for an index, it has limitations. The succinct trie may be challenging to use with certain data storage systems. For example, some column stores utilize a row key and a column key, each of which is a string of bytes. The data is sorted based upon both the column key and the row key. The succinct trie may be unable to correctly store the row and column components of the key. Thus, a search of the succinct trie for a particular key may not return the correct result. Other storage systems may also use keys having multiple data components. Succinct tries may incorrectly store such multi-component keys and be unable to return accurate results.

For example, in the user name example above, the ST is desired to store data for the users Adam Smith; John Smith; David Smithe; and Ralph Smyth using keys smith.adam, smith.john, smithe.david, smyth.ralph. As discussed above, the keys are desired to be sorted in order based on the last name, then the first name. An ST may order the keys as: smith.adam, smithe.david, smith.john, smyth.ralph. This sorting is incorrect because if the keys are sorted according to last name and then first name, the key smith.john should occur before smithe.david. Thus, a mechanism for efficiently storing an index, particularly an index that supports multi-component keys, is desired.

Mechanisms for constructing and querying a database that includes multi-component data are described. Constructing the database includes accessing the database comprising multi-component data and constructing an augmented succinct trie (AST) as an index of the database. The database includes sorted data blocks. Construction of the AST is based on the multi-component data. The AST includes indications of boundaries of the data components of the multi-component data. The index is provided for use in facilitating database queries. Querying the database includes accessing a key comprising multiple data components and augmenting the key with data component boundary information. The AST is searched using the augmented key and a search result provided as a value corresponding to the key in the database.

In some embodiments, the data blocks are sorted based on the multi-component data. For example, each key can include a byte array. The first key of each data block may be used for the succinct trie. For a byte in the byte array of the first key, constructing the succinct trie includes recording a label that corresponds to the byte, child data indicating whether the byte has at least one child in the byte array, level order unary degree sequence (LOUDS) information, and continuation information. The continuation information indicates whether the byte corresponds to an end of a data component of the multi-component data. Thus, continuation information designates boundaries between data components in the multi-component data. In some embodiments, a separate field is provided for the continuation information. In other embodiments, the continuation information is concatenated to a front of the label.

Figure 1:
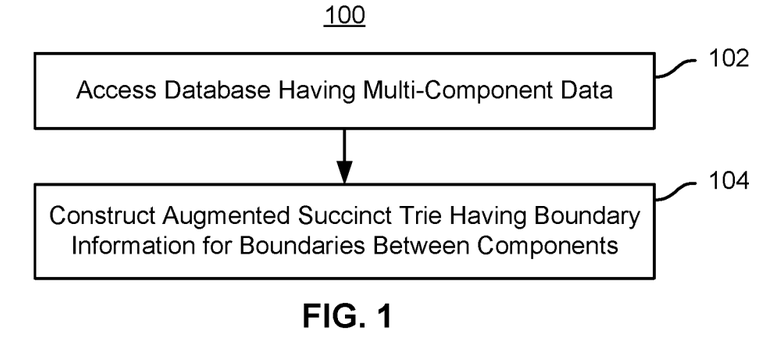
FIG. 1 is a flow chart depicting an embodiment of a process for constructing a database utilizing multi-component data.

FIG. 1 is a flow chart depicting an embodiment of method 100 for constructing a database system including multi-component data. Method 100 can be executed on a system such as 1000 of FIG. 10. Method 100 may include additional substeps not shown for clarity. Although shown in a particular order, at least some of the processes may be performed in another order including but not limited to in parallel. For simplicity, only some of the processes may be shown. Method 100 is utilized with a database that includes multi-component data. Multi-component data includes data that includes multiple data components. For example, data components include an individual's first name, last name, and social security number. Multi-component data may include a concatenation of the first name, last name and social security number. In some embodiments, the database with which method 100 is utilized employs multi-component keys. In such embodiments, the AST can be utilized as an index. In some embodiments, data not used as keys also has multiple data components.

The database is accessed, at 102. The database includes multiple data blocks. Each data block includes records. Each record has a key and a value. The data blocks are sorted in key order. The keys include multiple data components. In some embodiments, the values also include multiple data components. In some embodiments, the data blocks are accessed and information related to the first key in each data block is obtained at 102.

An augmented succinct trie (AST) is constructed using the multi-component data, at 104. The AST includes information on the boundaries between data components of the multi-component data. In some embodiments, the information regarding boundaries between data component ("continuation" information) may be encoded simply by setting a particular bit for a portion of the data component. In some embodiments, the first portion of a data component has the continuation bit set to "0", while remaining portions of the data component have the continuation bit set to "1" (or vice versa). In some embodiments, the last portion of a data component has the continuation bit set to "0", while remaining portions of the data component have the continuation bit set to "1" (or vice versa). In some embodiments, both the last portion of one data component and the first portion of the next data component have the continuation bit set to "0" and remaining portions of the data components have the continuation bit set to "1" (or vice versa). For example, for multi-component data in which each data component is a byte array, the continuation bit may be set to "0" for the first byte of a data component, the last byte of a data component, or both. Remaining bytes would have the continuation bit set to "1". Other encoding schemes are possible. Thus, the boundary between data components in multi-component data may be efficiently identified.

In addition to the indication of boundaries of the data components, the AST includes label information, child information and level order unary degree sequence (LOUDS) information for each multi-component data. The label information indicates where the AST might branch. For example, if the data component is a byte array, the label corresponds to a byte. The child information indicates whether the branch of the AST continues. The LOUDS data indicates boundaries of nodes. The AST may also be provided for use in an index of the database at 104.

Figure 2A:
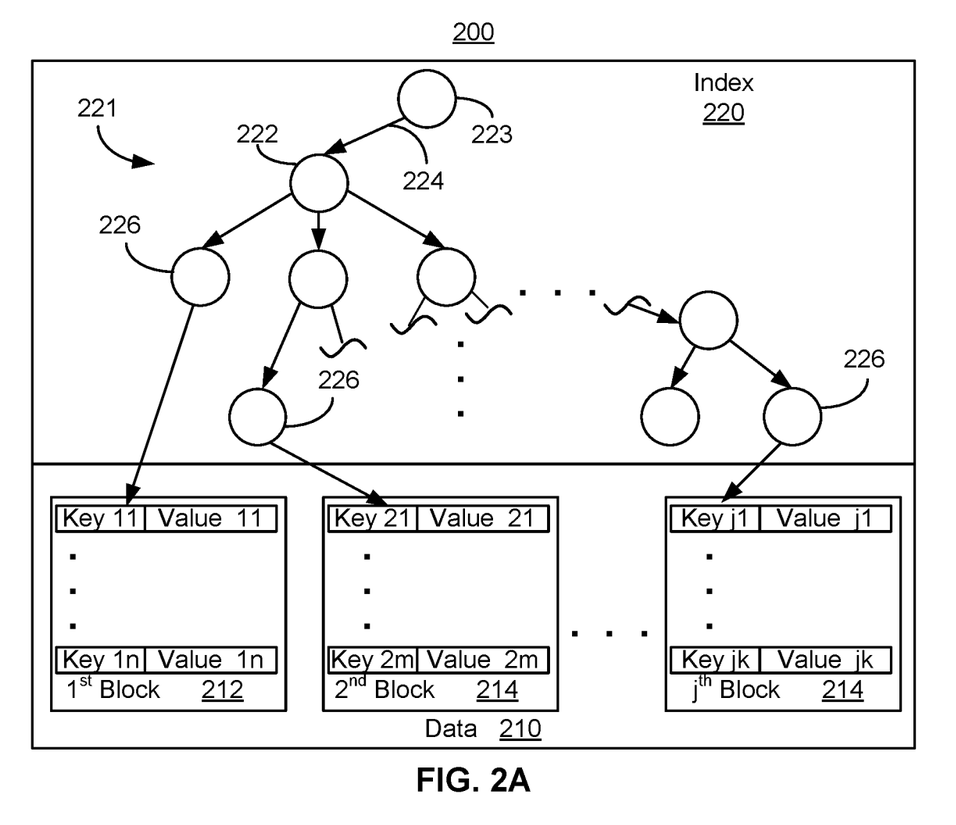
FIGS. 2A-2B depict an embodiment of a database system including an augmented succinct trie as an index and a record including a multi-component key.
Figure 2B:
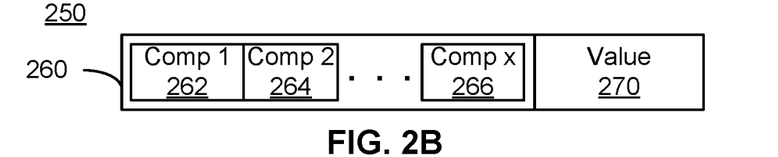

FIGS. 2A and 2B depict an embodiment of database system 200 constructed using method 100 and an embodiment of record 250 including a multi-component key. Database 200 includes data 210 and index 220. Data 210 includes a number (j) of data blocks, each of which includes a number of records. For example, first data block 212 includes n records, second data block 214 includes m records and $j^{th}$ data block includes k records. In another embodiment, each data block may have the same number of records. Each record includes a key and a value. The keys and values are designated by their block number and record number in FIG. 2A. For example, key 11 is the key for the first record of first data block 212. Value 11 is the value for the first record of first data block 212. Records in data blocks 212, 214 through 216 are sorted in order of the keys. Thus, key 11 of first data block 212 has the lowest key. Key jk of $j^{th}$ data block 216 has the highest key. In some embodiments, data 210 may be stored on disk or other permanent storage.

The keys of database system 200 include multiple data components. This can be seen from exemplary record 250, which includes a multi-component key 260 and a value 270. Record 250 may be one of the records in data 210. Thus, record 250 is an example of one of the records stored in data blocks 212, 214, through 216. Key 260 includes data components 262, 264, through 266. In the embodiment shown, key 260 includes x data components, where x is an integer. Value 270 might also include multiple data components.

Using method 100, data 210 are accessed at 102. More specifically, keys 260 are accessed. At 104, AST 221 formed based on keys 260 of data 210. AST 221 forms all or part of index 220. AST 221 is provided for keys which share a prefix (a starting string of data). AST 221 includes nodes 222 and branches 224. For clarity, only node 222, branch 224, and their sub-nodes and sub-branches are shown. The AST can include additional nodes and branches. Root node 223 is also separately labeled. AST 221 branches based upon the values (e.g. labels) of data components of a multi-component key. In addition, AST 221 includes data related to boundaries between data components 262, 264 through 266 in key 260. AST 221 terminates in end points 226, of which only three are labeled. End points 226 include values that point to the corresponding data blocks 212, 214 and 216. In some embodiments, index 220 is stored in memory. Consequently, index 220 may be more rapidly accessed.

Thus, database system 200 is provided. In addition to data 210, database system 200 includes AST 221 that can be used in index 220. Because AST 221 is constructed, less space is consumed by index 220. For example, AST 221/index 220 consumes less space than an index of a corresponding B+ tree. Consequently, index 220/AST 221 may be stored in memory, while data 210 may be stored in disk or other permanent storage. As a result, index 220/AST 221 may be more rapidly accessed. Querying database system 200 may be made more efficient. Further, keys 260 for database system 200 may be multi-component. AST 221 includes information regarding boundaries between data components of the keys. Thus, the space-saving AST 221 may be used in index 220 even though multi-component keys are used. Consequently, querying of multi-component key database 200 may be improved.

Figure 3:
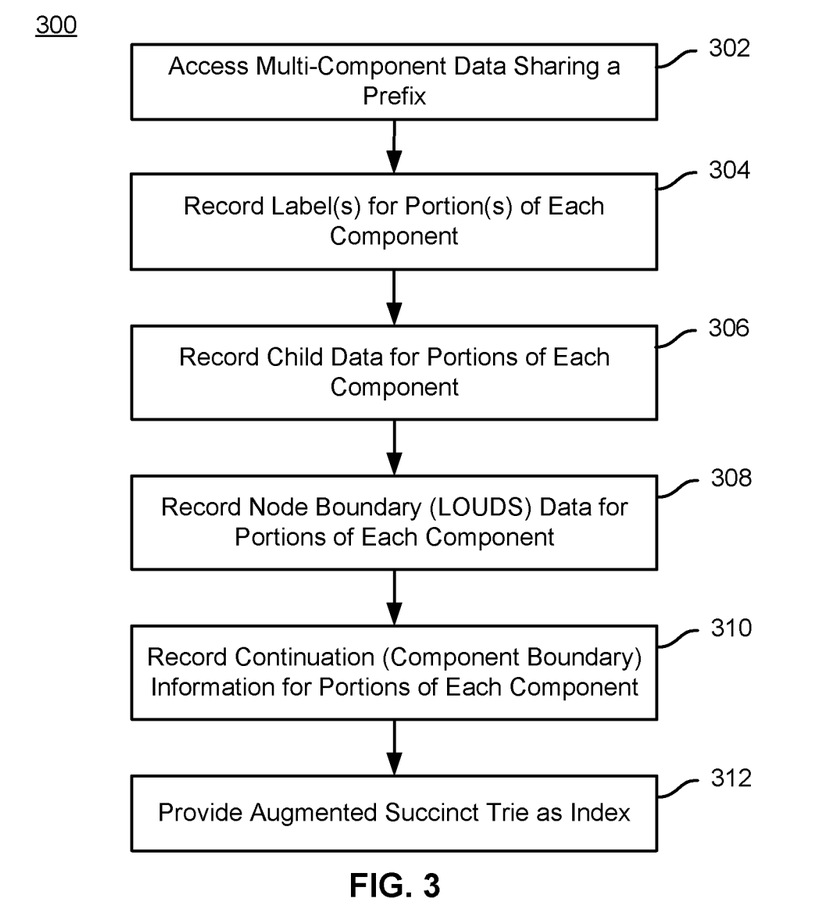
FIG. 3 is a flow chart depicting another embodiment of a process for providing an augmented succinct trie for a database system utilizing multi-component keys.

FIG. 3 is a flow chart depicting another embodiment of a process for providing an AST for a database system utilizing multi-component keys. Method 300 may include additional substeps not shown for clarity. Although shown in a particular order, at least some of the processes may be performed in another order including but not limited to in parallel. For simplicity, only some of the processes may be shown. Method 300 is utilized with a database that includes multi-component data. Method 300 is described in the context of keys including the multi-component data and the AST being used in an index. However, nothing prevents method 300 for being used in connection with another portion of a record (such as a value) and/or the AST being utilized for other purposes.

Multi-component data in the data base system is accessed, at 302. In particular, keys sharing a prefix with another multi-component data entry are accessed, at 302. For example, two multi-component keys may be representations of "ab.a" and "abc.d", where a period denotes a boundary between data components. These keys may be represented as a byte array, with the first byte corresponding to "a" and a second byte corresponding to "b". These keys share the prefix "ab" and are accessed at 302. However, a key "bd.e" would not share a prefix with the keys "ab.c" and "abc.d" and thus not be part of the same AST.

For portions of the data components of each key, the label(s) are recorded, at 304. In the example above, a label is recorded for each byte of the keys, e.g., "a" is recorded for the first byte and "b" recorded for the second byte of key "ab.c". At 306, child data is recorded for each portion of each data component. Child data indicates whether the branch of the AST continues or terminates. In the example above, the child data indicates whether there are additional bytes in the data component of the keys. Thus, "a" for the key "ab.c" and "b" for the key "abc.d" have child data indicating there are child branches in the AST. In some embodiments, the child data can be expressed as "1" for having child branches and "0" for not having child branches. The LOUDS information is recorded for portions of each data component of a key, at 308. LOUDS information indicates whether a portion of the key is at the boundary of a node. In the example above, "a" is at a boundary of a node because "a" is the start of the keys in the AST, and the LOUDS information is expressed as "1" for a boundary or "0" for a non-boundary. Continuation information is also recorded for each portion of the data components of the keys, at 310. The continuation information indicates whether a boundary of a data component is reached. In the example above, "b" for key "ab.c" and "c" for key "abc.d" are at boundaries of the data component. This information is recorded at 310. In some embodiments, continuation information is recorded by setting a continuation bit for the first or last portion of a data component. Thus, 310 takes into account the multi-component nature of the keys.

By recording the labels, child data, LOUDS data and continuation information for the keys, the AST is constructed at 302, 304, 306, 308 and 310. The AST represents keys having common prefixes. Thus, the AST constructed represents the keys. At 312, this AST is provided for the index for the multi-component keys.

Using method 300, an AST that can be used in an index is provided. Because the AST is constructed, less space may be consumed by the index. The index may be stored in memory and may be more rapidly accessed. Querying the database system may be made more efficient. This can be accomplished despite the use of keys that have multiple data components. Thus, a space-saving AST may be used in an index even through multi-component keys are used. Consequently, querying of a multi-component key database may be improved.

Figure 4A:
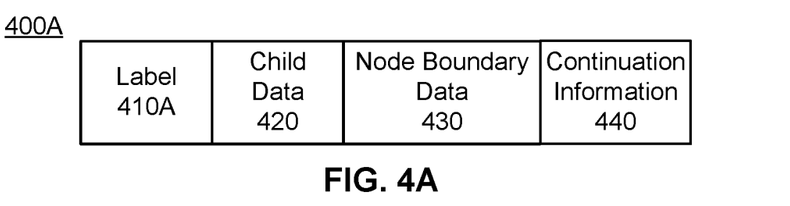
FIGS. 4A-4B are diagrams depicting embodiments of information recorded for an augmented succinct trie for multi-component keys.
Figure 4B:
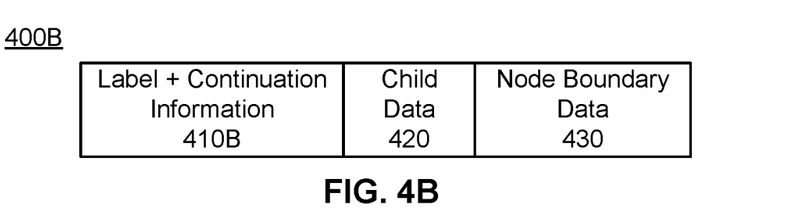

FIGS. 4A and 4B are diagrams depicting embodiments of information 400A and 400B recorded for an AST for multi-component keys. Thus, information 400A and/or 400B may be part of an AST. Information 400A includes label 410A, child data 420, node boundary (LOUDS) data 430 and continuation information 440. Thus, information 400A includes four fields for which data are recorded for a portion of a data component of a multi-component key. Information 400B includes label and continuation information 410B, child data 420 and node boundary data 430. For information 400B, the label and continuation information have been concatenated into a single field. For example, the first byte of a data component may have a leading zero in the label field 410A. Thus, information 400B includes three fields. In other embodiments, the label, child, LOUDS and continuation information may be organized in another manner.

Figure 5:
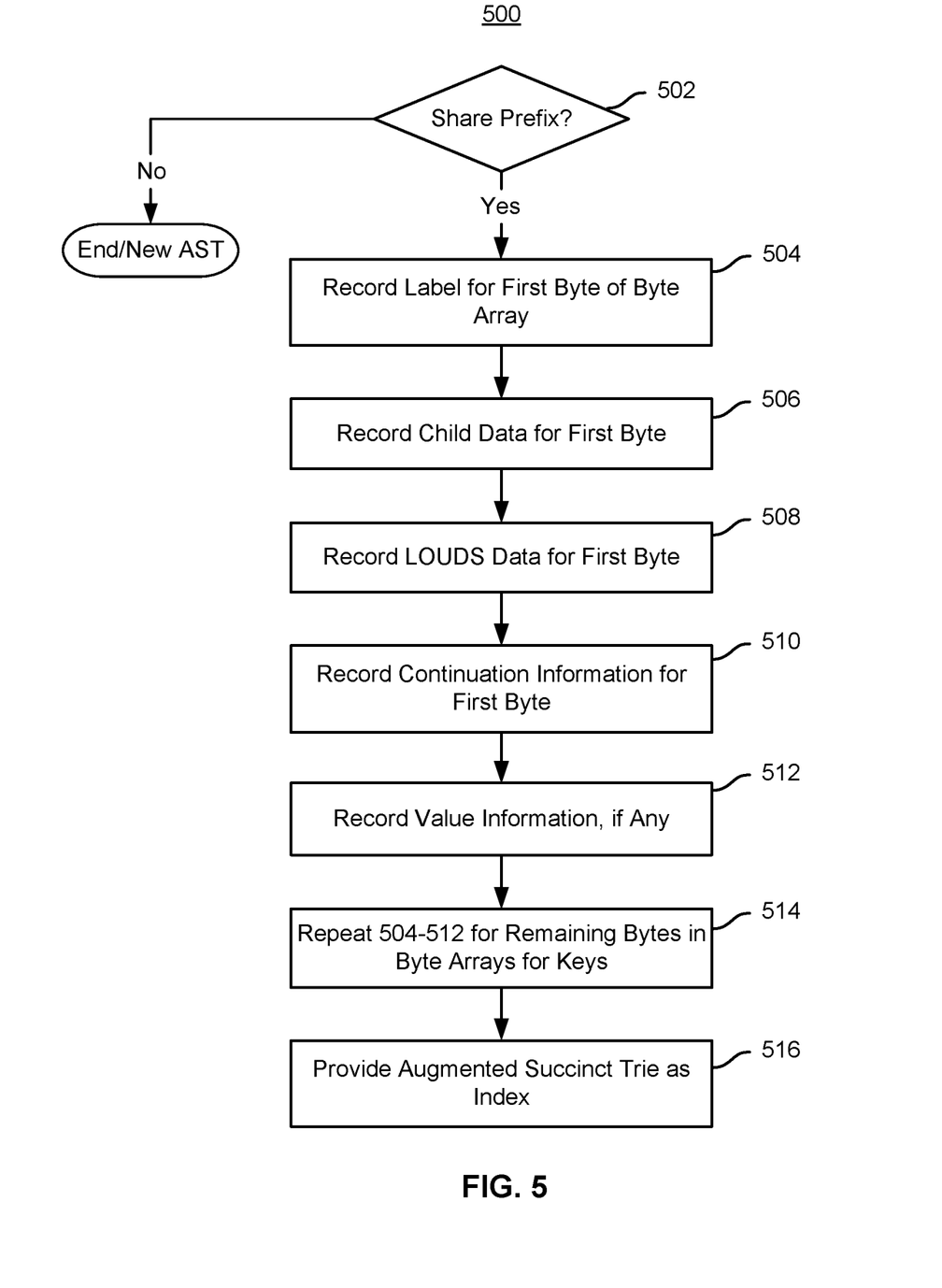
FIG. 5 is a flow chart depicting another embodiment of a process for providing an augmented succinct trie for a database system utilizing multi-component keys.

FIG. 5 is a flow chart depicting another embodiment of a process for providing an AST for a database system utilizing multi-component keys. Method 500 may include additional substeps not shown for clarity. Although shown in a particular order, at least some of the processes may be performed in another order including but not limited to in parallel. For simplicity, only some of the processes may be shown. Method 500 is utilized with a database that includes multi-component data. Method 500 is described in the context of keys including the multi-component data and the AST being used in an index. However, nothing prevents method 500 for being used in connection with another portion of a record (such as a value) and/or the AST being utilized for other purposes. Method 500 is also discussed in the context of data components of a key being byte arrays. Thus, each data component includes one or more bytes and each key includes one or more data components. In some embodiments, the keys are representations of alphanumeric keys. Thus, each byte in the key corresponds to a character. For method 500, the multi-component keys being indexed are the first keys of the data blocks of a data storage system. Because the data blocks are sorted by the keys, the first keys in each data block are also sorted. Stated differently, the first keys in adjacent data blocks are closest in value.

It is determined whether the data for some or all of the first keys share a prefix, at 502. Thus, at 502 it can be determined whether the first keys for some set of adjacent data blocks share a common prefix. If so, then these keys are part of the same AST. If the adjacent keys do not share a common prefix, they are not part of the same AST. Thus, such keys are indexed separately, for example in a different AST.

The label for the first byte (e.g. the first character) of the keys is recorded, at 504. At 506, child data is recorded for the byte. The LOUDS information is recorded for the byte, at 508. Continuation information is also recorded for the byte, at 510. A value may be recorded for the byte, at 512. For an index, the corresponding value is a pointer to the appropriate data block. However, not all bytes of a key have value information recorded in the AST. At 514, 504 through 512 are repeated for the remaining bytes in the byte arrays for the data components of the keys. Thus, the label, child data, LOUDS, continuation information and value (if any) are recorded for the keys. Thus, the AST constructed represents the keys. At 516, this AST is provided for the index for the multi-component keys.

Figure 6:
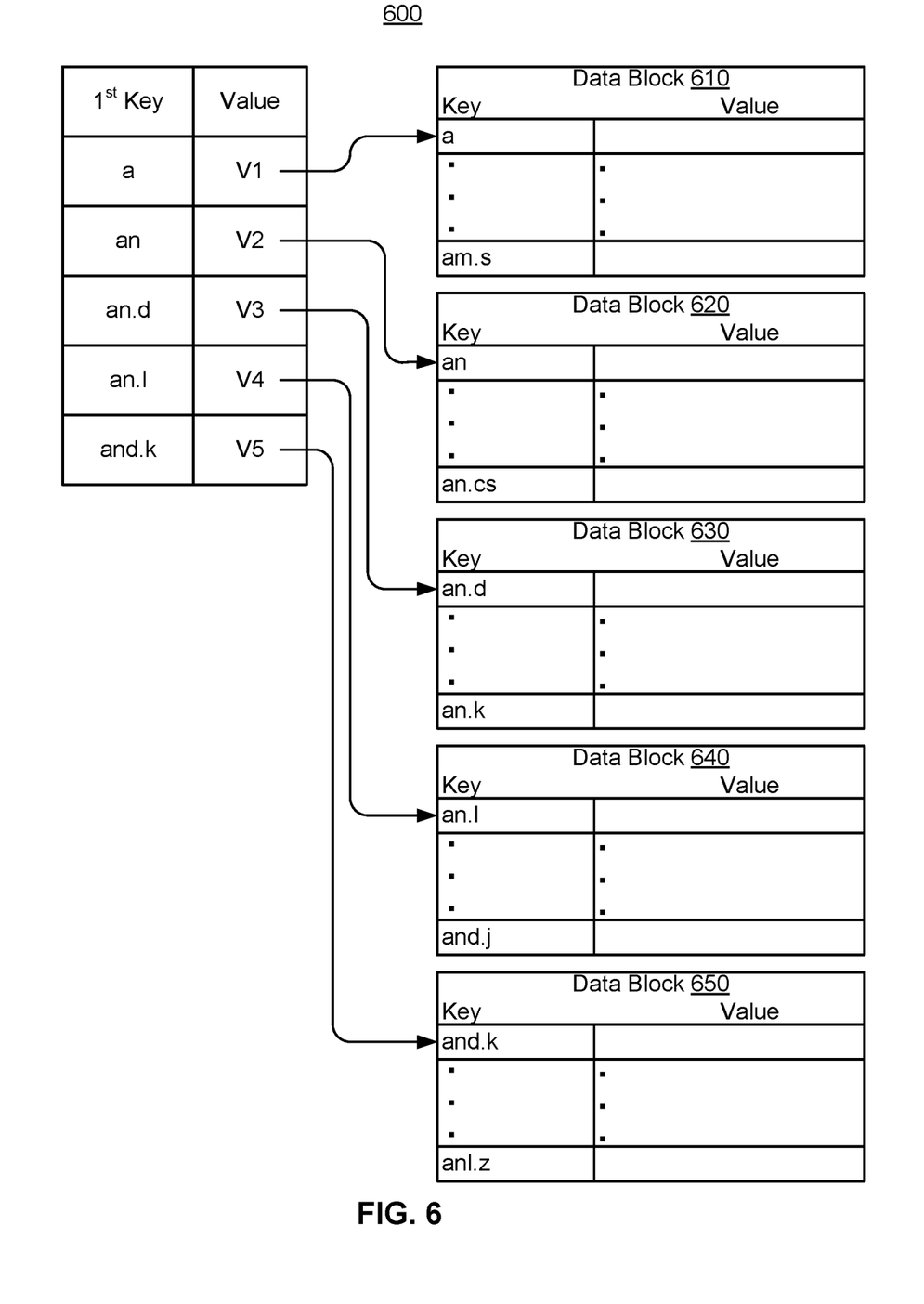
FIG. 6 is a diagram depicting a portion of a database system utilizing multi-component keys.
Figure 7:
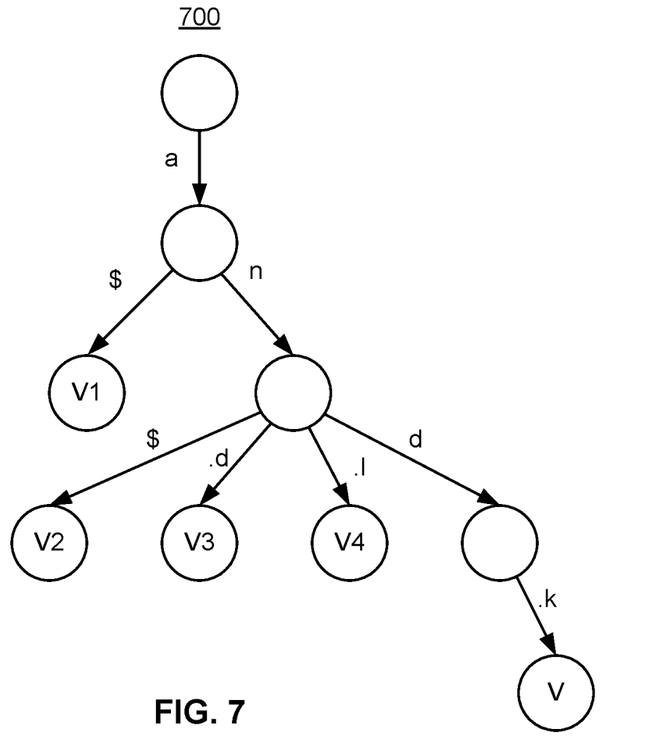
FIG. 7 depicts an embodiment of an augmented succinct trie capable of functioning as an index for a database system utilizing multi-component keys.
Figure 8:
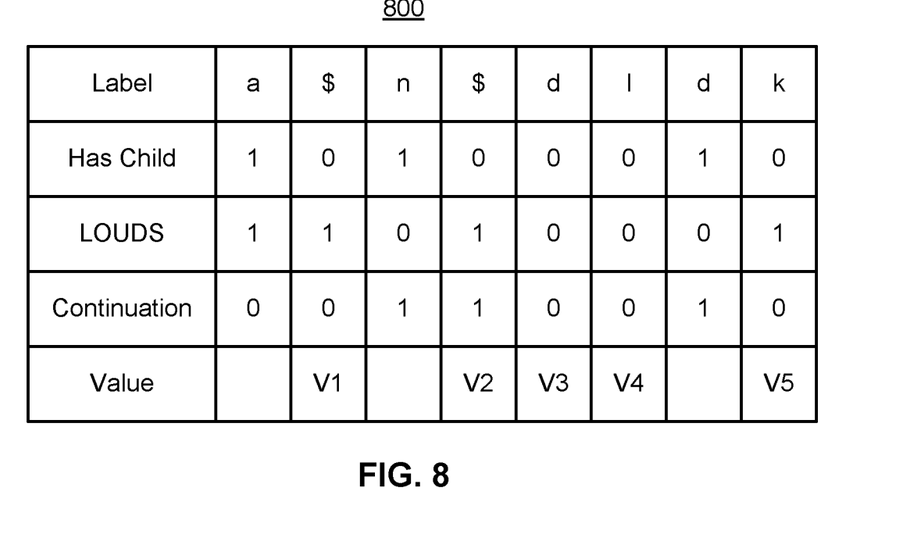
FIG. 8 depicts an embodiment of data information recorded for an augmented succinct trie capable of functioning as an index for a database system utilizing multi-component keys.

For example, refer to FIGS. 6-8. FIG. 6 depicts a portion of database system 600. FIG. 7 depicts the logical structure of an AST 700 corresponding to the index for database system 600. FIG. 8 depicts data structure 800 recorded for the AST 700 and, therefore, for the index. The AST 700 and data structure 800 may be constructed using method 500. Database system 600 utilizes multi-component keys and includes data blocks 610, 620, 630, 640 and 650. The range of keys for each data block 610, 620, 630 and 640 are also indicated. The first keys for data blocks 610, 620, 630, 640 and 650 that are desired to be indexed are also separately depicted. Thus, the first keys are "a", "an", "an.d" "an.l" and "and.k". Also depicted are the desired values for these first keys: V1, V2, V3, V4 and V5. These values are pointers to the corresponding data blocks 610, 620, 630, 640 and 650.

The keys in database system 600 can include multiple data components. Each data component is a byte array. For example, the first key "an" has only a first data component, which has two bytes in its byte array. A first byte corresponds to "a", while the second byte corresponds to "n". The first key "an.d" has two data components. The first data component is "an". The second data component is "d". The first data component has two bytes in its byte array and shares the same prefix (an) as the first key "an". The second data component has one byte in its byte array. This byte corresponds to "d". Similarly, first key "an.l" has two data components: "an" and "l". The first data component has two bytes in its array corresponding to "an", while the second data component has one byte in its array corresponding to "l". The key "and.k" also has two data components: "and" and "k". The first data component has three bytes in its byte array corresponding to "a", "n" and "d". The second data component has one byte corresponding to "k". Although not shown, database system 600 may include other data blocks and other keys having another number of data components and/or another number of bytes in each byte array. However, the first keys of such data blocks may not share a prefix with the data blocks 610, 620, 630, 640 and 650. These first keys "a", "an", "an.d" "an.l" and "and.k" share the common prefix "an" and thus are candidates for storage using AST 700.

Using method 500, information for the first byte of the first keys is recorded. The first byte for the first keys of data blocks 610, 620, 630, 640 and 650 is "a". Thus, the label for this byte is "a" and recorded in data structure 800 at 504. This is also shown in AST 700. As can be seen in logical structure 700 and a comparison of first key "a" with adjacent first key "an", this byte has a child. Consequently, a "1" is recorded in the child information in data structure 800 at 506. Because the first key is "a", this byte is also at the leading boundary of a node. In other words, the "a" is the first label for a node. Consequently, a "1" is provided in data structure 800 in LOUDS for label "a", at 508. Continuation information for data structure 800 is provided by recording a "0" for a start of a new data component and a "1" for a continuation of a data component. Label "a" is at the start of the first data component for first key "a". Thus, the continuation information is recorded as "0" in data structure 800 at 510. No value is recorded at 512.

The next label recorded in data structure 800 is "$". This is a special label indicating the beginning of a node. The continuation bit for the label "$" is ignored in a search. Because first key "a" is the entirety of the key, the value V1 for first key "a" is recorded for "$" in AST 700 and data structure 800 at 512. Also recorded in data structure 800 is the indication that "$" has no children (i.e. no subsequent branches) and a LOUDS value of "1".

At 514, 504 through 512 are repeated for subsequent bytes. Thus, label data for the second byte, "n", for key "an" is recorded in data structure 800 at 504. As can be seen in AST 700 and by a comparison of first key "an" with adjacent key "an.d", there are branches from "n". Thus, a "1" is recorded for the child information in data structure 800 at 506. The label "n" is not the first in a node, so its LOUDS value is "0". This is recorded at 508. However, "n" is a continuation of the first data component. Thus, the continuation information for "n" recorded in data structure 800 at 510 is "1".

The "$" label is the next label recorded for first key "an". This is shown in AST 700 and data structure 800. In addition, value V2 is recorded for label "$".

This process is repeated for the next byte in the first keys. This byte is for first keys "an.d", "an.l" and "and.k". For first key "an.d", the next byte corresponding to "d" is part of a second data component. There are no child branches from this "d" and this label is not a first label of a node. Thus, the child and LOUDS information in data structure 800 is recorded as "0". In addition, "d" is at the start of a second data component. Thus, the continuation information is recorded as "0" in data structure 800. Value V3 is also recorded for "d". Similarly, for first key "an.l", the byte corresponding to "l" is similarly situated to the byte for "d" in first key "an.d". Thus, the child, LOUDS and continuation information recorded for "l" are the same as for "d". However, the value recorded for "l" is V4.

For key "and.k", the label d is recorded. Label "d" has a child branch. Thus, the child information for "d" is recorded as a "1" in data structure 800. Label "d" is the third byte of the first data component. Thus, "d" is a continuation of the first data component and its continuation information is entered as "1" in data structure 800. The last label to be considered is "k". Because it is the first label of the node, its LOUDS information is "1". The value V5 is also recorded for this label in data structure 800. In the embodiment shown in FIG. 8, the continuation information is recorded in a separate field. In another embodiment, the continuation information may be concatenated with the label. For example, the label for the first byte in a byte array may have a leading zero (0) appended. For example, the label "a" would be recorded as "0a". In other embodiments, continuation information may be encoded in another manner and data structure 800 configured accordingly.

Using method 500, AST 700 and corresponding data structure 800 are provided. AST 700 and corresponding data structure 800 can be used in an index for data storage system 600. Thus, less space may be consumed by the index and querying database system 800 may be made more efficient. This can be accomplished despite the use of keys that have multiple data components.

Figure 9:
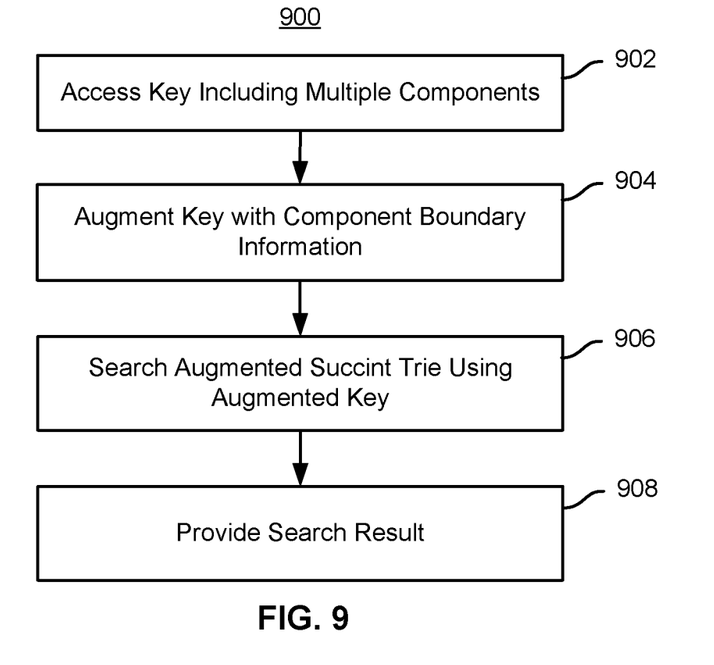
FIG. 9 is a flow chart depicting another embodiment of a process for searching an augmented succinct trie for a database system utilizing multi-component keys.

FIG. 9 is a flow chart depicting another embodiment of process 900 for searching an AST for a database system utilizing multi-component keys. Method 900 may include additional substeps not shown for clarity. Although shown in a particular order, at least some of the processes may be performed in another order including but not limited to in parallel. For simplicity, only some of the processes may be shown. Method 900 is utilized with a database that includes multi-component data. Method 900 is described in the context of keys including the multi-component data and an AST being used in an index.

A key including multiple data components is accessed, at 902. Thus, the key includes multi-component data. In some embodiments, a user may provide a search query and the corresponding key is generated based on the query. For example, a user may enter an individual's first name and last name. The corresponding key lastname.firstname is generated at 902.

The key for the query is augmented with data component boundary information, at 904. In some embodiments, 904 includes providing the appropriate continuation information for the key. For example, a continuation bit may be generated for the appropriate data components. This continuation bit may be provided in a separate field or concatenated with another field, such as the label described above.

The AST corresponding to the index is searched using the augmented key, at 906. Thus, the tree is traversed based upon the key as well as the nodes and branches generated during construction of the AST. In some embodiments, traversal of the tree includes searching the corresponding data structure. Through the AST, the appropriate data block can be accessed. Thus, use of the AST/index greatly narrows the number of records to be searched. The data block can then be searched for the specific key. A search result as a value corresponding to the key in the database is returned, at 908.

For example, suppose the key "an.f" is desired to be searched and is provided at 902. At 904, this key may be augmented with continuation information. For example, "an.f" may be converted to a three byte string with an additional bit corresponding to the continuation bit for the second data component.

AST 700 is searched at 906. The label "a" is common. A binary search for "n" indicates that the branch to "$", ".d", ".l" and "d" should be taken. The continuation information for "an.f" indicates that the "d" corresponding to the first component is not the appropriate label. Based on the combination of the label and the continuation information, the correct sorting order is achieved. Consequently, a binary search can be used to locate the correct branch for the key. Thus, the resulting search of AST 700 (or data structure 800) results in value V3. Consequently, the data block 630 having records for keys "an.d" through "an.k" is searched. The appropriate record is returned to the user at 908. Because a binary search is performed, the search can also be carried out faster than linear scan could. Thus, the appropriate record is efficiently found and returned at 908.

Using method 900, a key may be augmented with continuation information and the appropriate AST of the index, such as AST 700 and corresponding data structure 800, searched. The appropriate data block is identified and searched. Because less space is consumed by the AST, the AST may be stored in memory and the search using method 900 made more efficient. Further, the correct result is returned despite the use of multi-component keys.

Figure 10:
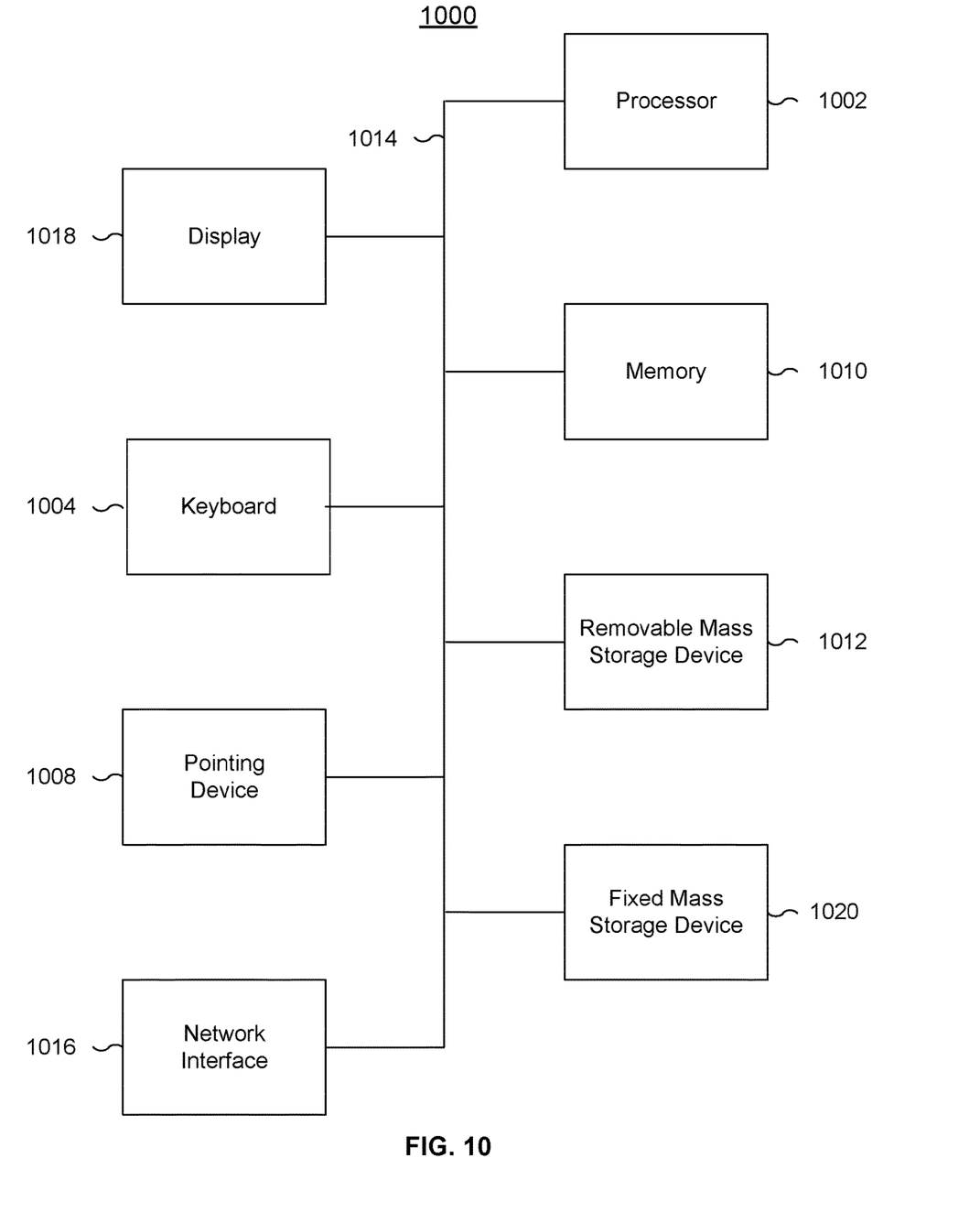
FIG. 10 is a functional diagram illustrating an embodiment of a database system for providing an augmented succinct trie for multi-segment keys.

FIG. 10 is a functional diagram illustrating an embodiment of a database system for providing and/or searching an AST for multi-component data. As will be apparent, other computer system architectures and configurations can be used to provide and/or search an AST for multi-component data. In some embodiments, database system 200 of FIG. 2 may be implemented using computer system 1000.

Computer system 1000, which includes various subsystems as described below, includes at least one microprocessor subsystem (also referred to as a processor(s) or a central processing unit (CPU)) 1002. For example, processor(s) 1002 can be implemented by a single-chip processor or by multiple processors. In some embodiments, processor(s) 1002 is a general purpose digital processor that controls the operation of the computer system 1000. Using instructions retrieved from memory 1010, the processor(s) 1002 control the reception and manipulation of input data, and the output and display of data on output devices (e.g., display 1018).

Processor(s) 1002 are coupled bi-directionally with memory 1010, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data.

Primary storage can also store programming instructions and data, in the form of data objects and text objects, in addition to other data and instructions for processes operating on processor(s) 1002. Primary storage typically includes basic operating instructions, program code, data, and objects used by the processor(s) 1002 to perform its functions (e.g., programmed instructions). For example, memory 1010 can include any suitable computer readable storage media, described below, depending on whether, for example, data access needs to be bi-directional or uni-directional. For example, processor(s) 1002 can also directly and very rapidly retrieve and store frequently needed data in a cache memory (not shown).

A removable mass storage device 1012 provides additional data storage capacity for the computer system 1000 and is coupled either bi-directionally (read/write) or uni-directionally (read only) to processor(s) 1002. For example, storage 1012 can also include computer readable media such as magnetic tape, flash memory, PC-CARDS, portable mass storage devices, holographic storage devices, and other storage devices. A fixed mass storage 1020 can also, for example, provide additional data storage capacity. One common example of fixed mass storage 1020 is a hard disk drive. Mass storages 1012 and 1020 generally store additional programming instructions, data, and the like that typically are not in active use by the processor(s) 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 914 can also be used to provide access to other subsystems and devices. As shown, these can include a display 1018, a network interface 1016, a keyboard 1004, and a pointing device 1008, as well as an auxiliary input/output device interface, a sound card, speakers, and other subsystems as needed. For example, the pointing device 1008 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor(s) 1002 can be used to connect the computer system 1000 to an external network and transfer data according to standard protocols. For example, various process embodiments disclosed herein can be executed on processor (s) 1002, or can be performed across a network such as the Internet, intranet networks, or local area networks, in conjunction with a remote processor that shares a portion of the processing. Additional mass storage devices (not shown) can also be connected to processor(s) 1002 through network interface 1016.

An auxiliary I/O device interface (not shown) can be used in conjunction with computer system 1000. The auxiliary I/O device interface can include general and customized interfaces that allow the processor(s) 1002 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1000 may comprise a smart phone or a tablet computer. For example, memory 1010 is configured to store program instructions, and processor 1002, coupled to memory 1010, is configured to read the program instructions stored by memory 1010 and, in response, execute steps described in process 100 of FIG. 1, process 300 of FIG. 3, process 500 of FIG. 5 and/or be utilized in implementing database system 200 of FIG. 2, 600 of FIG. 6 and/or augmented succinct tries 700 and/or 220.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    accessing, by one or more processors a database comprising a plurality of records that comprise multi-component data, the database including a plurality of sorted data blocks;
    constructing, by the one or more processors, an augmented succinct trie (AST) as an index of the database, the constructing being based on the multi-component data, wherein:
        the AST includes a set of indications of boundaries between components of the multi-component data of a record;
    storing, by the one or more processors, the index to a non-transitory computer-readable storage medium, wherein the index is used to facilitate database queries;
    receiving, by the one or more processors, a database query; and
    in response to receiving the database query,
        determining, by the one or more processors, a key for data responsive to the query, wherein the key comprises multiple data components;
        constructing by the one or more processors, an augmented key with one or more indications of boundaries between a plurality of data components of the multiple data components, wherein the one or more indications comprises:
            level order unary degree sequence (LOUDS) information that indicates whether a portion of the key is at a boundary of a node; and
            continuation information that indicates whether a boundary of a data component is reached;
        searching, by the one or more processors, the AST based at least in part on the augmented key; and
        providing, by the one or more processors, a search result based on the searching the AST, the search result corresponding to data that is responsive to the database query.

2. The method of claim 1, wherein the constructing includes:
    for a byte in a byte array of a first key of each data block, recording: a label that corresponds to the byte, and child data indicating whether the byte has at least one child in the byte array, wherein the continuation information indicates whether the byte corresponds to an end of a data component of the multi-component data.

3. The method of claim 2, wherein the recording of the continuation information further includes:

providing a separate field for the continuation information.

4. The method of claim 2, wherein the recording of the continuation information further includes:
concatenating the continuation information to front of the label.

5. The method of claim 2, wherein the recording of the continuation information further includes:
setting a bit as a "0" for the byte corresponding to a start of the data component and setting the bit as a "1" for the byte not corresponding to the start of the data component.

6. The method of claim 1, wherein the sorted data blocks are sorted based on the multi-component data.

7. The method of claim 1, wherein the constructing includes:
for each data component of a first key in each data block, recording: at least one label corresponding to at least a portion of the data component, child data indicating whether at least a portion of the data component has at least one child, level order unary degree sequence information for the at least the portion of the data component, and continuation information indicating whether the at least the portion of the data component corresponds to an end of the data component of the multi-component data.

8. The method of claim 1, wherein the multi-component data is a concatenation of two data elements comprised in a record of the database.

9. The method of claim 1, wherein the AST further includes indications of boundaries of nodes comprised in the AST.

10. The method of claim 1, wherein each of the set of indications of boundaries respectively corresponds to a different boundary and serves as a demarcation between two components in the multi-component data.

11. The method of claim 10, wherein the AST further comprises level order unary degree sequence (LOUDS) information for the multi-component data.

12. The method of claim 11, wherein the LOUDS information indicates boundaries between nodes in the AST.

13. A non-transitory computer program product, the computer program product being embodied in a non-transitory computer readable storage medium and comprising computer instructions for:
accessing, by one or more processors, a database comprising a plurality of records that comprise multi-component data, the database including a plurality of sorted data blocks;
constructing, by the one or more processors, an augmented succinct trie (AST) as an index of the database, the constructing being based on the multi-component data, wherein:
the AST includes a set of indications of boundaries between components of the multi-component data of a record;
storing by the one or more processors the index to a computer-readable storage medium, wherein the index is used to facilitate database queries;
receiving, by the one or more processors, a database query; and
in response to receiving the database query,
determining, by the one or more processors, a key for data responsive to the query, wherein the key comprises multiple data components;
constructing, by the one or more processors, an augmented key with one or more indications of boundaries between a plurality of data components of the multiple data components, wherein the one or more indications comprises:
level order unary degree sequence (LOUDS) information that indicates whether a portion of the key is at a boundary of a node; and
continuation information that indicates whether a boundary of a data component is reached;
searching, by the one or more processors, the AST based at least in part on the augmented key; and
providing, by the one or more processors, a search result based on the searching the AST, the search result corresponding to data that is responsive to the database query.

14. The computer program product of claim 13, wherein the computer instructions for constructing further include computer instructions for:
for a byte in a byte array of a first key of each data block, recording: a label that corresponds to the byte, and child data indicating whether the byte has at least one child in the byte array, wherein the continuation information indicates whether the byte corresponds to an end of a data component of the multi-component data.

15. The computer program product of claim 14, wherein the computer instructions for recording of the continuation information further include computer instructions for:
providing a separate field for the continuation information.

16. The computer program product of claim 14, wherein the computer instructions for recording of the continuation information further include computer instructions for:
concatenating the continuation information to front of the label.

17. The computer program product of claim 14, wherein the computer instructions for recording of the continuation information further include computer instructions for:
setting a bit as a "0" for the byte corresponding to a start of the data component and setting the bit as a "1" for the byte not corresponding to the start of the data component.

18. The computer program product of claim 13, wherein the sorted data blocks are sorted based on the multi-component data.

19. The computer program product of claim 13, wherein the computer instructions for constructing include computer instructions for:
for each data component of a first key in each data block, recording: at least one label corresponding to at least a portion of the data component, child data indicating whether at least a portion of the data component has at least one child, level order unary degree sequence information for the at least the portion of the data component, and continuation information indicating whether the at least the portion of the data component corresponds to an end of the data component of the multi-component data.

20. A system, comprising:
a processor configured to:
access the database comprising a plurality of records that comprise multi-component data, the database including a plurality of sorted data blocks;
construct an augmented succinct trie (AST) as an index of the database, the constructing being based on the multi-component data, wherein:
the AST includes a set of indications of boundaries between components of the multi-component data of a record;

store the index in a memory, wherein the index is used to facilitate database queries;

receive a database query; and in response to receiving the database query,
  determine a key for data responsive to the query, wherein the key comprises multiple data components;
  construct an augmented key with one or more indications of boundaries between a plurality of data components of the multiple data components, wherein the one or more indications comprises:
    level order unary degree sequence (LOUDS) information that indicates whether a portion of the key is at a boundary of a node; and
    continuation information that indicates whether a boundary of a data component is reached;
  search the AST based at least in part on the augmented key; and
  provide a search result based on the searching the AST, the search result corresponding to data that is responsive to the database query; and a memory coupled to the processor and configured to provide the processor with instructions.

21. The system of claim 20, wherein the processor being configured to construct the AST includes:
  for a byte in a byte array of a first key of each data block, recording: a label that corresponds to the byte, and child data indicating whether the byte has at least one child in the byte array, wherein the continuation information indicates whether the byte corresponds to an end of a data component of the multi-component data.

22. The system of claim 21, wherein the recording of the continuation information further includes: at least one of providing a separate field for the continuation information and concatenating the continuation information to front of the label.

23. The system of claim 21, wherein to record the continuation information, the processor is further configured to:
  set a bit as a "0" for the byte corresponding to a start of the data component and setting the bit as a "1" for the byte not corresponding to the start of the data component.

24. The system of claim 20, wherein the processor being configured to construct the AST includes:
  for each data component of a first key in each data block, recording at least one label corresponding to at least a portion of the data component, child data indicating whether at least a portion of the data component has at least one child, level order unary degree sequence information for the at least the portion of the data component, and continuation information indicating whether the at least the portion of the data component corresponds to an end of the data component of the multi-component data.

25. The system of claim 20 wherein the processor is further configured to query the database, and wherein to query the database, the processor is further configured to:
  access a key comprising multiple data components;
  augment the key with data component boundary information;
  search the AST using the augmented key; and
  provide a search result as a value corresponding to the key in the database.

* * * * *